United States Patent [19]
Frank et al.

[11] Patent Number: 4,490,027
[45] Date of Patent: Dec. 25, 1984

[54] MAGNETICALLY ENCODED FILM CONTAINERS AND CAMERA ADJUSTING MECHANISMS RESPONSIVE THERETO

[75] Inventors: Lee F. Frank, Rochester; James K. Lee, Pittsford, both of N.Y.

[73] Assignee: Eastman Kodak Company, Rochester, N.Y.

[21] Appl. No.: 458,500

[22] Filed: Jan. 17, 1983

[51] Int. Cl.³ .................. G01R 33/02; G03B 7/24; G03B 17/26
[52] U.S. Cl. .................. 354/21; 324/251; 324/259; 354/275
[58] Field of Search .......... 354/21, 275; 33/1 PT; 324/247, 251, 259; 352/78 C; 242/71.1, 71.2; 206/316, 455

[56] References Cited

U.S. PATENT DOCUMENTS

| | | | |
|---|---|---|---|
| 2,674,009 | 4/1954 | Williams | 18/59 |
| 2,772,392 | 11/1956 | Mohr | 324/259 |
| 3,485,157 | 12/1969 | Nerwin | 95/31 |
| 3,558,934 | 1/1971 | Dorsch et al. | 324/251 X |
| 3,593,635 | 7/1971 | Servetnick | 354/275 X |
| 3,667,363 | 6/1972 | Tanaka | 95/31 |
| 3,918,801 | 11/1975 | Bauhofer | 352/72 |
| 4,024,557 | 5/1977 | Aoyanra et al. | 354/275 |
| 4,025,930 | 5/1977 | Wolffe | 354/64 |
| 4,113,609 | 9/1978 | King et al. | 324/251 X |
| 4,223,228 | 9/1980 | Kaplan | 250/491 |
| 4,340,286 | 7/1982 | Carr | 354/105 |

FOREIGN PATENT DOCUMENTS 0039492 11/1981 European Pat. Off. .
738910 10/1955 United Kingdom ............... 324/259

OTHER PUBLICATIONS

Research Disclosure, No. 17033, Jun. 1978.

*Primary Examiner*—John Gonzales
*Attorney, Agent, or Firm*—Thomas H. Close

[57] ABSTRACT

Film related information is applied to a film container in the form of oriented macroscopic magnetic fields having strength sufficient to deflect a mechanical magnetic sensor. In a preferred embodiment of the invention, the metal end cap of a standard 35 mm film can is magnetized to encode film related information. The information is sensed in a simple mechanical camera by a sensing magnet mounted for movement in response to the orientation of the magnetic field directly above the end cap, and a trapping mechanism for trapping the sensing magnet and mechanically amplifying the information contained in the orientation of the sensing magnet. In an electronic camera, the orientation of the magnetic field is sensed by a pair of magneto-electric sensors oriented to sense orthogonal components of the magnetic field.

9 Claims, 9 Drawing Figures

FIG. 7
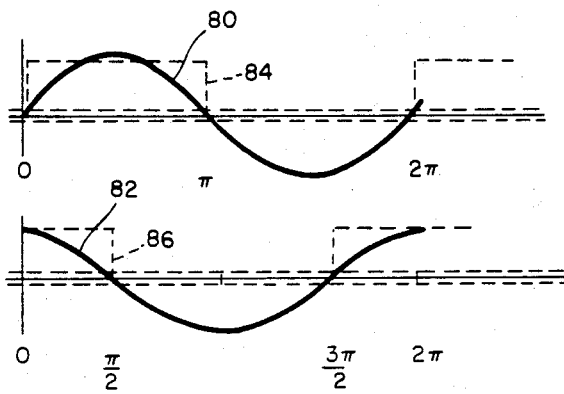
FIG. 8
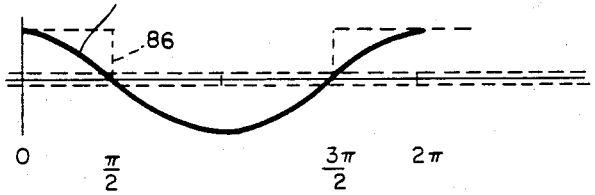
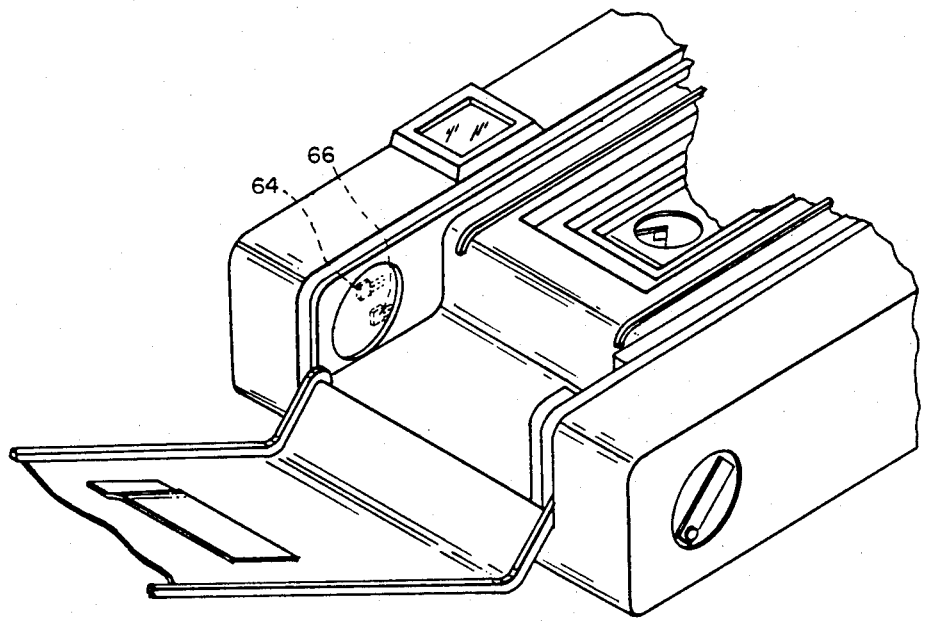
FIG. 9

MAGNETICALLY ENCODED FILM CONTAINERS AND CAMERA ADJUSTING MECHANISMS RESPONSIVE THERETO

BACKGROUND OF THE INVENTION

1. Field of the Invention

The present invention relates to the magnetic coding of information on a film container and to camera apparatus adapted to respond to such information.

2. Discussion Related to the Problem

As disclosed in European Patent Application No. 0039492, published Nov. 11, 1981, it is known to provide a magnetic recording medium on a photographic film container for encoding information such as the number of film frames in the container, the photographic speed of the film, film type, and exposure latitude. The film container disclosed in the European application includes a disc of magnetic recording material that is attached to the end of a film spool. Information encoded on the disc is read out by rotating the disc past a magnetic read head when film is removed from the container.

Use of this technique requires relative movement between the magnetic disc and the read-head. The information must be memorized by the camera mechanism after each film advance and prior to the next camera actuation. In practice, weeks or months may pass between the last reading of the information and the next use of the information, so long-term memory or some other means must be provided to replenish the information prior to a subsequent actuation of the camera. Rather complex electronic circuitry comparable to that in a magnetic tape player must be provided in the camera to sense the magnetic information recorded on the disc. The magnetic information coded on the magnetic material is not available for use in lower-cost, non-electronic cameras.

The problem faced by the present inventors was to provide a means for magnetically encoding film related information on a film container that could be used by either a camera having electronic circuitry or a non-electronic camera.

SOLUTION TO THE PROBLEM—SUMMARY OF THE INVENTION

We solved the above noted problems by encoding information on a film container in the form of an oriented macroscopic magnetic field of sufficient strength to be detected mechanically by a moveably mounted detecting magnet. In a preferred embodiment of the invention, film related information is encoded on a standard 35 mm metal film can by magnetizing an end cap of the film can. The information is contained in the angular orientation of the north-to-south pole of the magnetic field generated by the cap of the film can, with respect to a mechanical feature of the film can, such as the film exit slot. Alternatively, permanent magnetic material capable of providing a macroscopic magnetic field is added to the container. A mechanical sensor for sensing the orientation of the magnetic field comprises a sensing magnet mounted for movement in the camera in response to the orientation of the magnetic field on the film can. The sensing magnet carries a cam surface that is sensed in response to closing of a film loading door by a caliper mechanism mechanically connected to the camera control mechanism.

An electronic sensor for sensing the orientation of the magnetic field comprises a pair of solid state magnetoelectric transducers oriented in the camera to sense orthogonal components of the magnetic field generated by a magnetically encoded film container, thereby obviating the need for relative motion between the film container and the sensors.

In a preferred embodiment of the electronic sensing apparatus, the solid state transducers comprise Hall effect devices, connected to a pair of Schmidt triggers to produce a two-bit binary code representing the orientation of the magnetic field generated by the film container.

BRIEF DESCRIPTION OF THE DRAWINGS

The invention will be described with reference to the accompanying drawings, wherein:

FIGS. 7 and 8 are waveform diagrams useful in explaining the operation of the circuit shown in FIG. 6; and FIG. 9 is a partial perspective view of a 35 mm camera incorporating the sensing and control circuit shown in FIG. 5.

DESCRIPTION OF THE PREFERRED EMBODIMENTS

Figure 1:
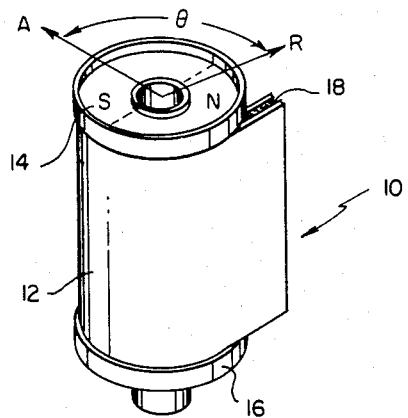
FIG. 1 is a perspective view of a standard 35 mm film can, bearing magnetically coded information according to the present invention.

A film container 10, magnetically encoded with film related information according to the present invention, is shown in FIG. 1. The film container 10 is of the standard 35 mm roll film variety, such as that manufactured by the Eastman Kodak Company for size 135 films. The container 10 comprises a cylindrical portion 12 formed from sheet metal, and a pair of end caps 14 and 16, likewise formed from sheet metal. A test of these cans revealed that the sheet metal is ferromagnetic and upon magnetization, will support a magnetic field of sufficient strength to reliably deflect a compass needle type magnetic sensor. According to the present invention, film related information is encoded on the film container by permanently magnetizing a macroscopic portion thereof. The term macroscopic is employed herein to distinguish the magnetic encoding method according to the present invention from the prior art magnetic encoding methods employing magnetic read and write heads for magnetizing small microscopic regions of magnetic material. By macroscopic is meant a field of sufficient strength to reliably deflect a compass needle type magnetic field sensor and includes fields in the range of about 10 Gauss and greater. The information carried by the magnetic field is contained in the orientation of the north-south axis of the magnetic field with respect to some fixed feature of the film container. Using such a scheme, the information is sensed, as described below, in an all mechanical camera by a sensing magnet mounted for movement in response to the orientation of the field produced by the film container. The information is sensed in an electronic camera by a pair of magneto-electric field sensors oriented to sense orthogonal components of the magnetic field produced by the film container. In this manner, the film related information is sensed without the need for relative movement between the sensors and the film container.

A simple example of a code for indicating one of four different film speeds is shown in Table 1 below. The cap 14 of a 35 mm film container is mangetized in a conventional manner, for example by contacting the cap with a powerful permanent magnet having north and south pole faces shaped to conform to the end cap. The information is contained in the angular orientation $\theta$ of the north-south axis A of magnetization, with respect to a radius R parallel with the film exit slot 18.

TABLE 1

| Orientation $\theta$ of Magnetic Field (radiens) | ISO Film Speed |
|---|---|
| 0 | 100 |
| $\pi/2$ | 200 |
| $\pi$ | 400 |
| $3\pi/2$ | 1,000 |

By encoding information in this manner, no modification of the present 35 mm film can is required. The technique obviates the need for changing present tooling to put bumps or slots in the cartridge, or for providing conductive or resistive areas on the film container. Furthermore, the magnetic code according to the present invention may be sensed electronically, or mechanically. To enhance the strength of the magnetic field produced by the film can, or to produce a magnetic field on a film container that is not ferromagnetic, permanent magnet material capable of providing a macroscopic magnetic field may be attached to or incorporated in the film container.

Figure 2:
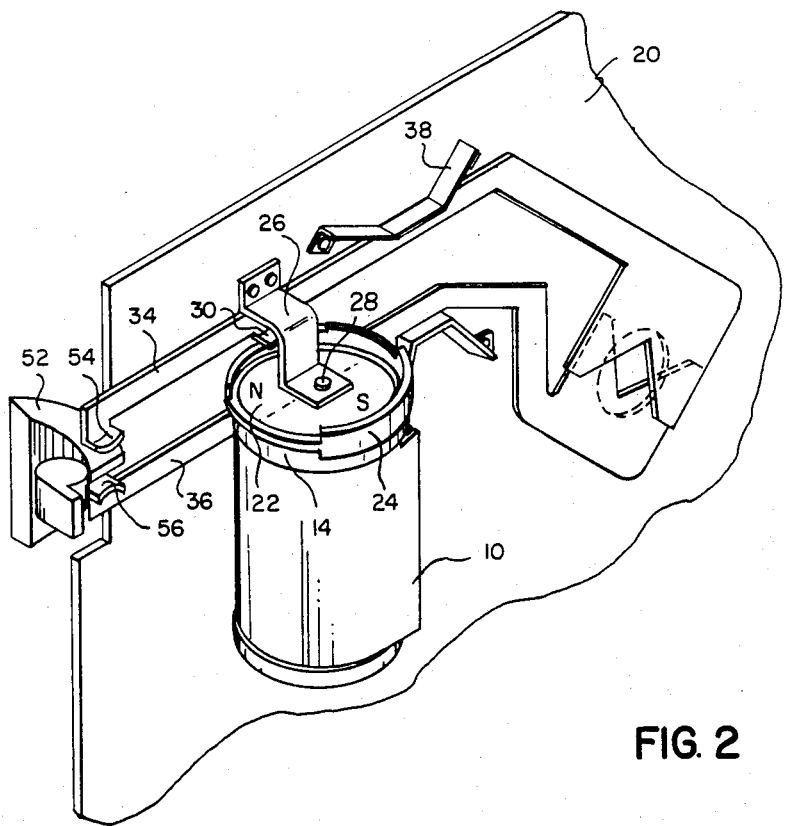
FIG. 2 is a perspective view of apparatus for mechanically sensing the orientation of the magnetic field on a film can of the type shown in FIG. 1, and adjusting an aperture in response thereto.
Figure 3:
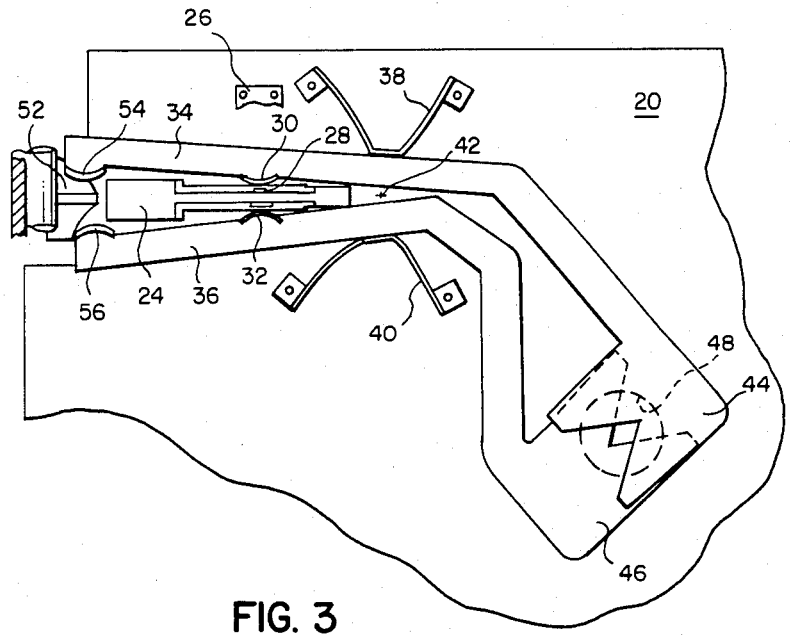
FIG. 3 is a plan view of the aperture adjusting apparatus shown in FIG. 2.

Referring now to FIG. 2, mechanical apparatus for sensing the orientation of a macroscopic magnetic field on a film can and for adjusting a photographic aperture in response thereto is shown. The apparatus is supported on a mechanism plate 20 (partially shown), and comprises a disc shaped sensing magnet 22, surrounded by a ring shaped cam 24. Sensing magnet 22 is mounted on mechanism plate 20 by a bracket 26, and is journalled to rotate about its central axis on a pin 28. Sensing magnet 22 is positioned in the camera to be immediately adjacent the magnetized end cap 14 of a film can 10. The sensing magnet 22 turns about pin 28 to align itself with the magnetic field of the end cap 14 of film can 10. The ring cam 24 is calipered by a pair of metering tabs 30 and 32 extending from a pair of arms 34 and 36. Arms 34 and 36 are pivotally mounted on mechanism plate 20 by flexure hinges 38 and 40 respectively (see FIG. 3). The flexure hinges define a virtual pivot point 42 for the two arms, and urge the arms 34 and 36 toward engagement with the ring cam 24. Arms 34 and 36 form a pair of aperture blades 44 and 46 which cooperate to define a photographic aperture over a fixed aperture 48 in mechanism plate 20. The size of the photographic aperture formed by the blades 44 and 46 is determined by the separation between metering tabs 30 and 32, and hence by the angular position of the sensing magnet 22.

Arms 34 and 36 are urged apart, away from cam ring 24, when the film loading door 50 (see FIG. 4) is opened. A wedge shaped cam 52, carried by the door hinge, is rotated between a pair of cam follower tabs 54 and 56 on arms 34 and 36, to urge the arms apart against the force of flexure hinges 38 and 40, thereby releasing the sensing magnet 22.

Figure 4:
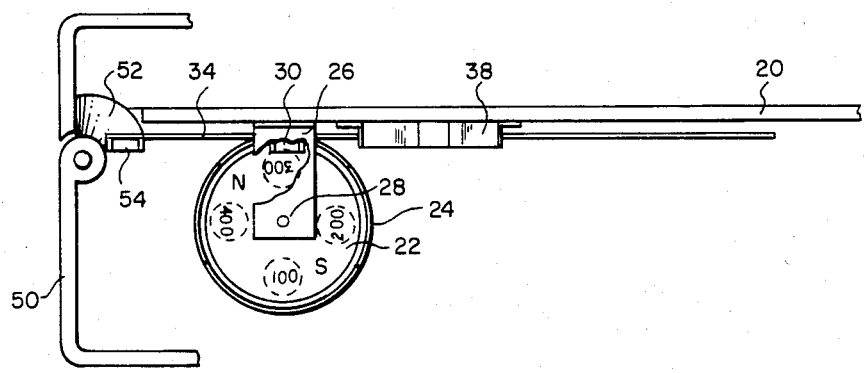
FIG. 4 is a top view of the aperture adjusting apparatus shown in FIG. 2.

When a film container is loaded into the camera, the sensing magnet 22, aligns itself with the magnetic field of the film cam. Then, when the film loading door is closed, cam 52 is withdrawn from between tabs 54 and 56 allowing arms 34 and 36 to caliper the ring cam 24, thereby setting the photographic aperture in accordance with the orientation of the magnetic field generated by the cap on the film can 10. As shown in FIG. 4, visual indications of film speed can be provided on sensing magnet 22. A window is then provided in the body of the camera for viewing this film speed indicator.

Figure 5:
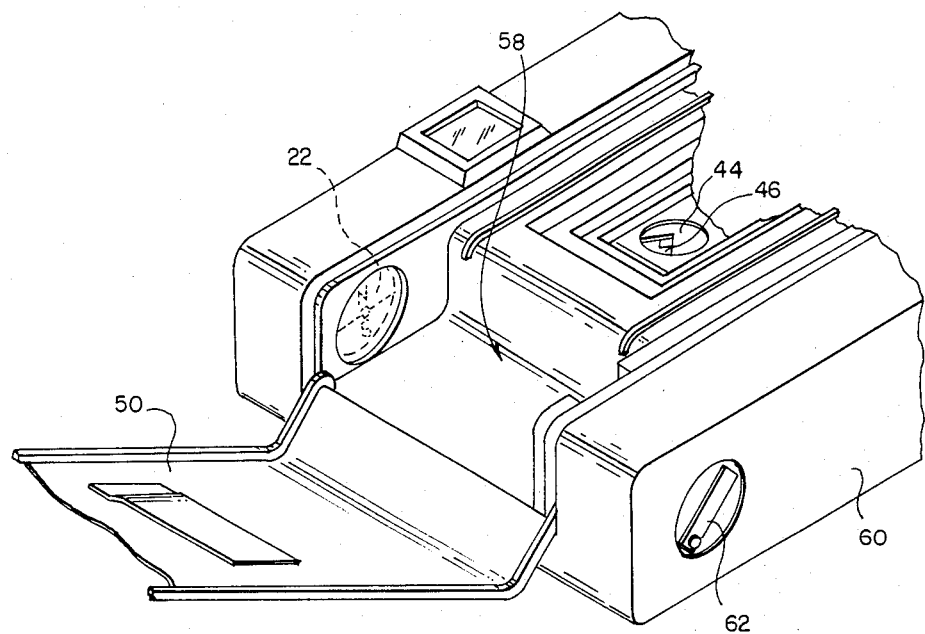
FIG. 5 is a partial perspective view of a 35 mm camera incorporating aperture adjusting apparatus of the type shown in FIG. 2.

FIG. 5 is a partial perspective view of a 35 mm camera employing a film speed sensing mechanism of the type described above. The film loading door 50 is opened to reveal a cavity 58 in the camera body 60 for receiving a 35 mm film can. The sensing magnet 22 (shown in phantom) is located at the top of the cavity behind a thin wall of opaque non-magnetic material such as black plastic. A film rewind crank 62 is located on the bottom of the camera body to avoid interference with the magnetic film speed sensor.

Figure 6:
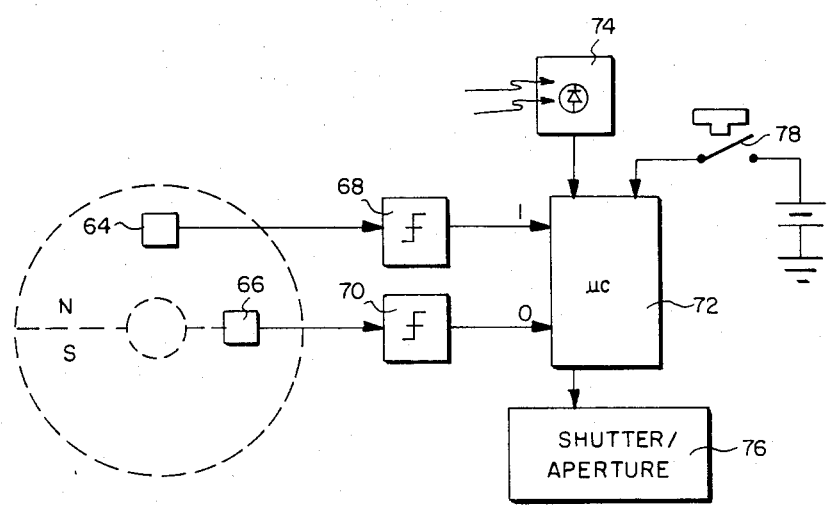
FIG. 6 is a schematic diagram of an electronic circuit for sensing the orientation of a magnetic field on a film container and controlling a camera mechanism in response thereto.

Referring now to FIG. 6, a sensing circuit for use in an electronic camera will be described. In a camera having electronic control circuitry, the orientation of the magnetic field generated by the film can according to the present invention, is sensed by magneto-electric sensors such as Hall effect devices or magneto-resistive devices. An electronic sensing circuit according to a preferred embodiment of the present invention comprises a pair of Hall effect sensors 64 and 66 oriented with respect to the magnetized portion of the film can to sense orthogonal components of the magnetic field generated thereby. The outputs of the Hall effect sensors are supplied respectively to a pair of Schmidt triggers 68 and 70. The outputs of the Schmidt triggers are supplied to a camera control computer, such as a microcomputer 72, as a two-bit logic signal indicative of the orientation of the magnetic field on the film can.

The camera control computer 72 receives a scene luminance signal from a photometer 74, in a known manner, and together with the luminance signal and the film speed signal, generates shutter and aperture control signals for controlling a shutter and aperture 76, in a known manner. Closure of a shutter release switch 78 initiates a photographic cycle in a known manner.

The solid line 80 in FIG. 7, schematically represents the output response of Hall effect sensor 64 as the magnetic field is rotated through $2\pi$ radians beneath the sensor. Similarly, solid line 82 in FIG. 8, schematically represents the output response of Hall effect sensor 66. It is noted that the sensor responses are 90° out of phase, and therefore together contain the information regarding the orientation of the magnetic field in the vicinity of the sensors. The respective responses of the sensors are digitized by Schmidt triggers 68 and 70 to yield binary logic level signals as indicated by the dashed lines 84 and 86 in FIGS. 7 and 8, respectively. The resulting two-bit binary signal representing the film speed is shown in Table 2 below.

TABLE 2

| Orientation θ of Magnetic Field (radiens) | ISO Film Speed | Bit 1 | Bit 2 |
|---|---|---|---|
| 0 | 100 | 1 | 1 |
| $\pi/2$ | 200 | 1 | 0 |
| $\pi$ | 400 | 0 | 0 |
| $3\pi/2$ | 1,000 | 0 | 1 |

FIG. 9 is a partial perspective view of a 35 mm camera showing the location of sensors 64 and 66 in the camera.

The invention has been described in detail with reference to certain preferred embodiments thereof, however, it will be apparent to one of skill in the art that modifications may be made within the scope of the accompanying claims. For example, an alternative method of sensing the orientation of the magnetic field generated by the film container would involve the use of a pair of reed switches with loosely coupled bias coils to make oscillator circuits similar to doorbell buzzers. The frequency of such a reed switch oscillator is highly sensitive to the orientation and strength of a magnetic field in its vicinity. A pair of such detectors could be used to sense orthogonal components of the magnetic field in the camera. Another method of electronically determining the orientation of the magnetic field involves the use of sensing coils to flip the magnetic field as in a core memory while measuring the back EMF in the sensing coil.

Although the magnetized portion of the film can has been shown as the top of a 35 mm film can, the bottom or sides of a 35 mm film can may also be magnetized according to the present invention, to carry film related information. Furthermore, although four orientations of a magnetic field have been described to yield a two-bit binary code, more angular orientations with finer divisions may be employed to encode a greater amount of information. Although the invention has been described with reference to a preferred embodiment wherein the metal portions of a film can itself are magnetized, magnetic material may be added to a film container or film support member to provide a macroscopic magnetic field of sufficient strength for deflecting a mechanical magnetic sensor.

The invention has been disclosed with apparatus for setting the aperture of a photographic camera, but it will be obvious to one of skill in the art that the invention can similarly be employed to adjust other camera functions such as shutter speed by positioning the rebound stop of an impact shutter in a known manner.

We claim:

1. A film container bearing magnetically encoded film information, characterized by, the information being encoded in the orientation of a macroscopic magnetic field having strength sufficient to physically move a mechanical magnetic sensor, whereby said encoded information is sensible either mechanically, or electronically.

2. A film container according to claim 1, further characterized in that said film container is a metal film can, said metal of said film can being magnetized to encode said information.

3. A film container according to claim 2, further characterized in that said film container is a standard 35 mm film can having a cylindrical central portion having a film exit slot and a pair of end caps, one of said end caps being magnetized, the information being encoded in the orientation of the north-south axis of magnetization with respect to said film exit slot.

4. A sensing device in combination with photographic apparatus adapted to receive a film container bearing film related information in the form of a magnetized portion of the container for generating selectively oriented macroscopic magnetic fields, comprising:

sensing magnet means mounted in the photographic apparatus in a position to be immediately adjacent the magnetized portion of the film container when received in the photographic apparatus for self aligning movement with the magnetic field generated by said magnetized portion of said container; and means for detecting the position of said sensing magnet means.

5. The invention claimed in claim 4, wherein said detecting means comprises a visual indicator of said coded information, and further comprising viewing means provided in said photographic apparatus for viewing said visual indicator.

6. The invention claimed in claim 4, wherein said detecting means comprises trapping means for mechanically trapping said sensing magnet at its aligned position.

7. The invention claimed in claim 6, wherein said information is film speed, and said trapping means is coupled to a camera aperture mechanism.

8. A sensing device in combination with photographic apparatus adapted to receive a film container bearing film related information in the form of a magnetized portion of the container for generating a selectively oriented macroscopic magnetic field, comprising:

a pair of magneto-electric sensors mounted in the photographic apparatus in a position to be immediately adjacent the magnetized portion of the film container when received in the photographic apparatus, and oriented to sense orthogonal components of the magnetic field generated by said portion of said container for generating outputs representing said orthogonal components, and logic circuit means responsive to the outputs of said sensors, for determining the orientation of said magnetic field.

9. The invention claimed in claim 8, wherein said sensors comprise Hall effect sensors connected to Schmidt triggers to generate a digital code in response to the orientation of said field.

* * * * *